United States Patent
Cäsar et al.

(10) Patent No.: US 6,543,531 B1
(45) Date of Patent: Apr. 8, 2003

(54) DEVICE AND METHOD FOR HEATING AND COOLING A COMPARTMENT OF A MOTOR VEHICLE

(75) Inventors: Roland Cäsar, Stuttgart (DE); Klaus Skupin, Notzingen (DE); Jürgen Wertenbach, Fellbach (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/277,725

(22) Filed: Mar. 29, 1999

(30) Foreign Application Priority Data

Mar. 27, 1998 (DE) .......................... 198 13 674

(51) Int. Cl.⁷ .......................... F25B 29/00; F25B 27/02; B60H 1/18; B60H 1/22
(52) U.S. Cl. .......................... 165/202; 165/42; 165/43; 165/240; 165/241; 165/242; 165/96; 62/238.6; 62/238.7; 62/160; 62/204; 237/2 B
(58) Field of Search .................. 237/2 B, 2 A; 62/238.6, 238.7, 160, 204; 165/240, 241, 242, 96, 42, 43, 202

(56) References Cited

U.S. PATENT DOCUMENTS

| | | | | |
|---|---|---|---|---|
| 1,117,444 A | * | 11/1914 | Robinson | 165/96 HV |
| 3,139,924 A | | 7/1964 | Schreiner | |
| 4,065,938 A | * | 1/1978 | Jonsson | 237/2 B |
| 4,493,193 A | * | 1/1985 | Fisher | 62/238.6 |
| 4,553,401 A | * | 11/1985 | Fisher | 237/2 B |
| 5,899,086 A | | 5/1999 | Noda et al. | |

FOREIGN PATENT DOCUMENTS

| | | | | |
|---|---|---|---|---|
| DE | 3140113 | * | 4/1983 | 62/238.6 |
| DE | 3318025 | | 11/1984 | |
| DE | 3443899 | | 3/1987 | |
| DE | 4142314 | | 9/1993 | |
| EP | 0 350 764 | | 1/1990 | |
| JP | 0138248 | * | 10/1979 | 62/238.6 |
| JP | 0095055 | * | 7/1980 | 62/238.7 |
| JP | 0000413 | * | 1/1983 | 62/238.6 |

(List continued on next page.)

OTHER PUBLICATIONS

Abstract (English) for JA 60,215418 (A) Yuuki Koishi Car Air Conditioner (1 page), Oct. 1985.*
Refrigeration and Air Conditioning, Richard Jordan and Gayle Priester, p. 80, Prentice–Hall, Inc. 1948.*
Abstract JA 60–215418, Koishi, Car Airconditioner (Oct. 1985).*

*Primary Examiner*—John K. Ford
(74) *Attorney, Agent, or Firm*—Crowell & Moring LLP

(57) ABSTRACT

A device and a method are provided for heating and cooling a compartment of a motor vehicle powered by an internal combustion engine. The device has a coolant circuit with a compressor, an ambient heat exchanger, at least one expansion device, an interior heat exchanger, and an exhaust heat exchanger that can be heated by exhaust gases from the engine. During heating, a coolant is guided through the compressor and through the interior heat exchanger connected downstream from the compressor, releasing heat. The compressor, interior heat exchanger, expansion device, ambient heat exchanger, and heat exchanger are connected in series so that the coolant is expanded in the expansion device to a temperature below an intake temperature of coolant into the compressor, exposed in the ambient heat exchanger to warmer ambient air, heated in the heat exchanger by the exhaust gases from the engine, and compressed in the compressor. During cooling, the compressor, ambient heat exchanger, expansion device, and interior heat exchanger are connected in series, with the coolant being exposed to cooler ambient air in the ambient heat exchanger and expanded in the expansion device to a temperature below a compartment air temperature. The compartment air is exposed in the interior heat exchanger to the cooler coolant.

19 Claims, 5 Drawing Sheets

FOREIGN PATENT DOCUMENTS

| | | | | |
|---|---|---|---|---|
| JP | 0122214 | * | 7/1983 | ................ 62/238.7 |
| JP | 0124138 | * | 7/1983 | ................ 62/238.7 |
| JP | 62-47412 | | 3/1987 | |
| JP | 0090430 | * | 4/1991 | ................ 237/2 B |
| JP | 403263562 | * | 11/1991 | ................ 62/238.7 |
| JP | 7-4777 | | 1/1995 | |
| WO | WO98/03362 | | 1/1998 | |

* cited by examiner

DEVICE AND METHOD FOR HEATING AND COOLING A COMPARTMENT OF A MOTOR VEHICLE

This application claims the priority of German patent application No. 198 13 674.9, filed Mar. 27, 1998, the disclosure of which is expressly incorporated by reference herein.

BACKGROUND AND SUMMARY OF THE INVENTION

The present invention relates to a device for heating and cooling a compartment of a motor vehicle powered by an internal combustion engine. The device has a coolant circuit with a compressor, an ambient heat exchanger, at least one expansion device, an interior air heat exchanger, and an exhaust heat exchanger that can be heated by exhaust gases from the internal combustion engine. A coolant is capable of being guided, during a heating operation, through the compressor and, while giving off heat, through the internal heat exchanger connected downstream from the compressor. A method for operating the device for heating and cooling the motor vehicle compartment is also disclosed. In the method, a coolant is compressed and heated in the compressor during heating and is then cooled in the interior heat exchanger.

A device of the type mentioned above for motor vehicles is known from DE 33 18 025 A1. This device includes an evaporator that is heated by the exhaust from an internal combustion engine. The evaporator is connected in series with an expansion valve which is operable only as long as the exhaust heat from the internal combustion engine has a specified value. In addition, a compressor is provided in this air conditioner and undergoes a reduction in rpm to a value different from zero when the effective cross section of the expansion valve changes. Heating operation takes place in three stages in this air conditioner. In the first stage, shortly after starting the motor vehicle, the compressor compresses the coolant and delivers it through a four-way valve to the evaporator where heat exchange takes place from the coolant to the air in the compartment that is flowing into the compartment. When exhaust heat from the engine is sufficient, a bypass line containing an exhaust heat exchanger is cut in by actuating a three-way valve. As a result, the exhaust heat from the engine supplies the heat required to the interior. This is followed by a conventional heating operation with an air-coolant heat exchanger to which the coolant from the engine is supplied. In this third stage, the bypass line is cut out again. Initially, the expansion valve is closed and the coolant that is in the bypass line is heated with the aid of the compressor.

The disadvantage of this known solution, however, is that the three-stage heating operation of the air conditioner requires a high construction and regulating-engineering cost.

A device is also known from DE 34 43 899 C2 for heating and cooling a compartment of a motor vehicle powered by an internal combustion engine. In this known device, if the compartment air is to be heated, the coolant is fed downstream from the compressor through a coolant switch into a parallel bypass line containing the condenser and expansion device. In this bypass line, the coolant is heated by the intermediate air in a heat exchanger by a closed intermediate air circuit. In the heat exchanger in the intermediate air circuit, the intermediate air delivered by a blower is heated by the exhaust stream from the engine.

The disadvantage of this arrangement, in addition to the complexity of the described solution, is that an auxiliary mass flow must be heated for heat transfer and only a portion of the heat is transferred in a useful manner. Moreover, the volume of heat, which is small in engines that have been optimized for efficiency, is further reduced in the exhaust by unavoidable transfer losses and is transferred only after a delay because of the thermal mass of the additional components involved.

Hence, the goal of the present invention is to increase the power transferred by the coolant circuit to the compartment air in vehicles, especially in consumption-optimized vehicles such as Diesel vehicles, completely and directly following starting, and to increase the efficiency of a device for heating and cooling and shorten its response time.

According to the invention, this goal is achieved by connecting a compressor, an interior heat exchanger, an expansion device, an ambient heat exchanger, and an exhaust heat exchanger in series so that, for a heating operation, the coolant is expandable in the expansion device to a temperature below an intake temperature of the coolant into the compressor, exposed in the ambient heat exchanger to warmer ambient air, heated in the exhaust heat exchanger by the exhaust gases from the internal combustion engine, and compressed in the compressor. For cooling, the compressor, the ambient heat exchanger, the expansion device, and the internal heat exchanger are connected in series, and the coolant is exposed, in the ambient heat exchanger, to colder ambient air and expanded in the expansion device to a temperature below a compartment air temperature. The compartment air is exposed to the coolant in the internal heat exchanger. Heating, in other words, is accomplished by successively expanding the coolant in the expansion device to a temperature below an intake temperature of the coolant into the compressor, exposing the coolant in the ambient heat exchanger, to ambient air, heating the coolant, in the exhaust heat exchanger, by exhaust gases from the internal combustion engine, and compressing the coolant in the compressor. For cooling, the coolant is successively exposed to colder ambient air in the ambient heat exchanger and expanded in the expansion device to a temperature below a compartment air temperature. The compartment air is exposed, in the interior heat exchanger, to the coolant.

When the device is used to heat a compartment of a motor vehicle, the coolant is successively expanded in an advantageous manner in the expansion device to a temperature below an intake temperature of the coolant into the compressor, exposed to ambient air in the ambient heat exchanger, heated in the exhaust heat exchanger by the exhaust from the engine, compressed in the compressor, and exposed to cold vehicle internal chamber air in the internal chamber heat exchanger. The vehicle interior is heated by the vehicle interior air heated in the interior heat exchanger.

As a result of the series connection of the components according to the invention, a thermodynamic cyclic process is made possible in which the heating and cooling power can be made available in a sufficient quantity under nearly all operating conditions of the engine. The coolant mass flow is radiated by the compressor as a function of the necessary heating or cooling power in such fashion that the coolant mass flow required for power to be absorbed or delivered is available at the interior heat exchanger.

The coolant mass flow is largely independent of the processor pressure in the circuit, so that the device, even with a low or high power requirement, can be operated steadily in a range with high efficiency. A regulating range of the heating or cooling power from zero to a maximum value that can be achieved within a technically feasible scope with a high efficiency of the device can be achieved.

With the method according to the invention, the mass flow of the coolant is varied as necessary as a function of the required heating power and the quantity of heat supplied from the environment and the exhaust heat of the engine so that the air conditioner permanently installed for cooling in summer can be used in a simple fashion for heating the interior of the motor vehicle on cold days.

BRIEF DESCRIPTION OF THE DRAWING FIGURES

Advantageous improvements and designs of the invention are claimed and will be described below in terms of principle with reference to the drawing figures.

DESCRIPTION OF THE PREFERRED EMBODIMENTS

Figure 1:
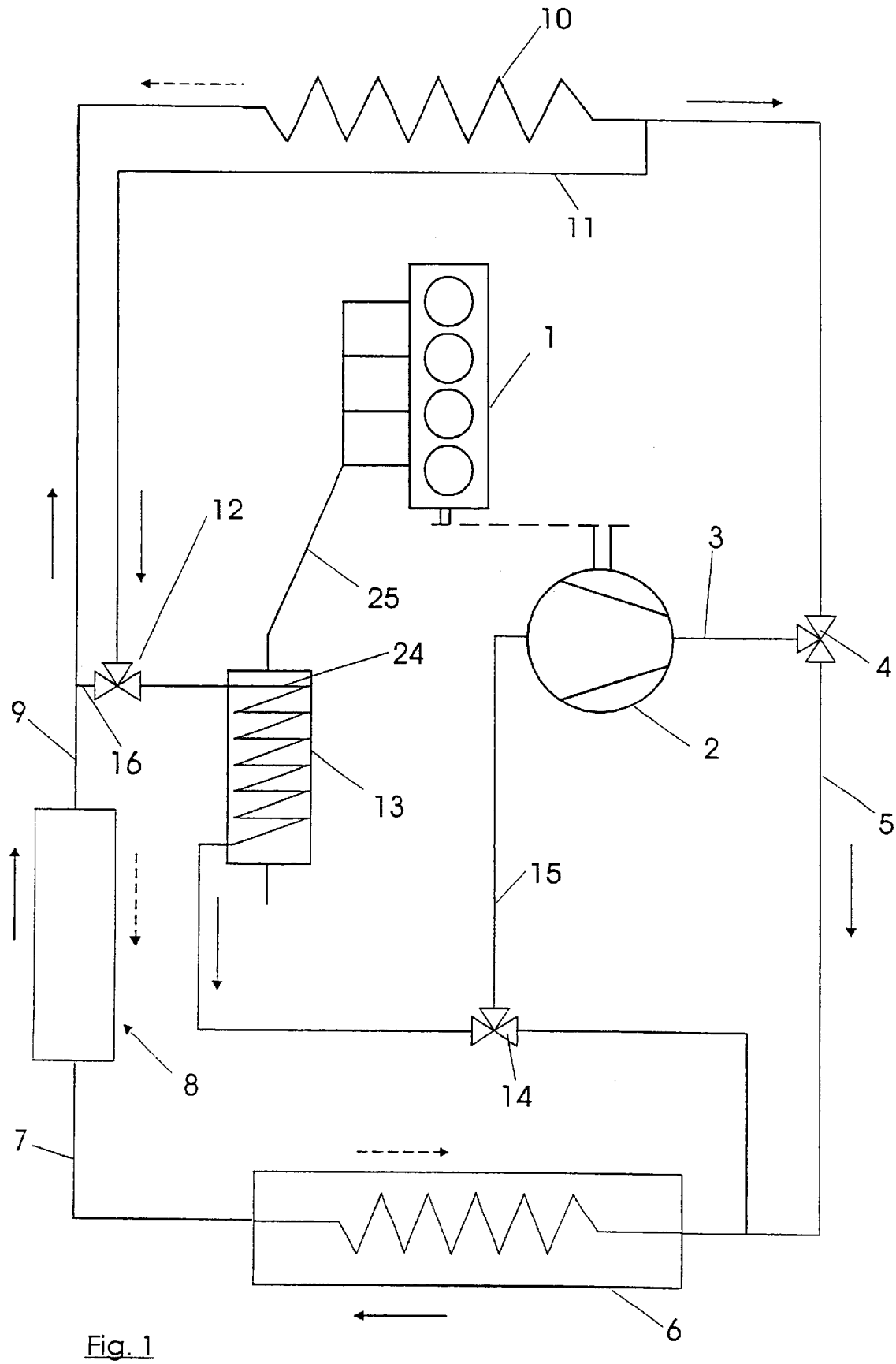
FIG. 1 is a schematic diagram of a device for heating and cooling a compartment of a motor vehicle.

FIG. 1 shows a circuit diagram of a device for heating and cooling a compartment of a motor vehicle with an engine 1, with the solid arrows showing the flow direction of coolant preheating operation and the dashed arrows showing the flow direction for cooling operation.

During a heating operation, coolant is compressed by a compressor 2 and enters a coolant line 3, then flowing to a 3/2-way valve designed as a mode switch for a heating or cooling operation. In the heating operation, the coolant is fed through a line 5 to an internal heat exchanger 6 where it is exposed to cold or compartment air which flows into the compartment through the interior heat exchanger 6. The coolant flows from the interior heat exchanger 6 through a coolant line 7 to an expansion device 8. From there, the coolant flows through a line 9 to an ambient heat exchanger 10 and is exposed to ambient air. In the ambient heat exchanger 10, the coolant is heated by the ambient air and then flows through a coolant line 11 and a 3/2-way valve 12 to an exhaust heat exchanger 13. There, the coolant is exposed to hot exhaust from the engine 1 and heated further. From exhaust heat exchanger 13, the coolant passes through a 3/2-way valve 14 designed as a circuit valve and a coolant line 15 back to compressor 2, completing the cycle.

If the coolant is expanded in expansion device 8 to a temperature that is below the ambient temperature, then the ambient air that flows through the ambient heat exchanger 10 can be cooled to a temperature below a saturation temperature. In this case, the water with which the ambient air is loaded condenses and is deposited on the ambient heat exchanger 10. If the temperature of the coolant is below the sublimation point of water, then the water changes to a solid state; in other words, the ambient heat exchanger 10 forms ice. In order to avoid this phenomenon, a bypass line 16 is opened by 3/2-way valve 12 and line 11 is closed so that the ambient heat exchanger 10 no longer has coolant flowing through it.

Figure 2:
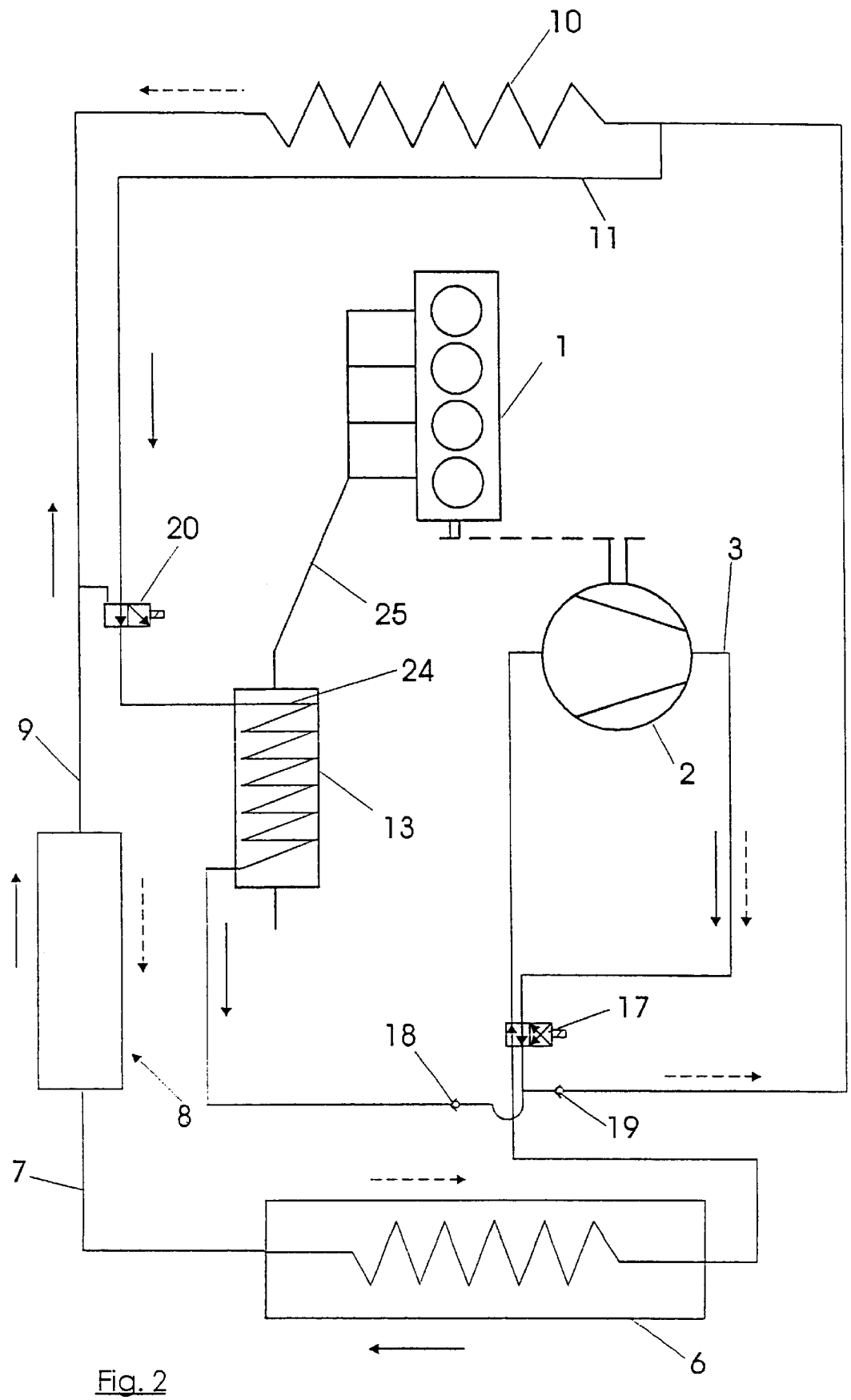
FIG. 2 is a circuit diagram of another embodiment of a device for heating and cooling a compartment of a motor vehicle similar to the device of FIG. 1.

FIG. 2 shows a circuit diagram of another embodiment of the device for heating and cooling a compartment of a motor vehicle according to FIG. 1. In this embodiment, the compressed coolant flows from a compressor 2 through a 4/2-way valve 17, by which the flow path of the coolant is set for the respective operating state, heating or cooling.

The solid arrows indicate the flow direction of the coolant for the heating operation and the dashed arrows show the flow direction for the cooling operation.

During the heating operation, the coolant initially gives off heat as it flows through the interior heat exchanger 6; it is then expanded in expansion unit 8 to a temperature that is below the ambient temperature, and then heated in succession in the ambient heat exchanger 10 and the exhaust heat exchanger 13. From there, it flows through a check valve 18 into the intake area of compressor 2.

At a check valve 19, because of the pressure loss in the circuit components, the pressure on its blocking side is not lower than at its through-flow side. The check valve thus remains closed because of a closing effect of an element not represented further, which can be designed as a spring. A 3/2-way circuit valve 20, in its resting position, allows the coolant to circulate as described above.

When the 3/2-way circuit valve 20 is actuated, the coolant is conducted directly from ambient heat exchanger 10 into exhaust heat exchanger 13 and is drawn off by compressor 2.

In this case also, the pressure differential at the check valve 19 is sufficient to ensure a through flow through exhaust heat exchanger 13.

During the cooling operation, the coolant flows, after being compressed, through the 4/2-way valve 17 which is in the resting position and the check valve 19 into the ambient heat exchanger 10 where it is exposed to the cooler ambient air. Then, the coolant flows through expansion device 8, is expanded there, and is exposed in interior heat exchanger 6 to warmer compartment air to be supplied to the compartment. The heated coolant then flows to the compressor 2 and is compressed there once again, with the coolant circuit closed.

An inadmissible connection of the coolant circuit by the check valve 18 is avoided by the fact that the pressure is lower on the through-flow side, because of the pressure losses, than on the blocking side.

Figure 3:
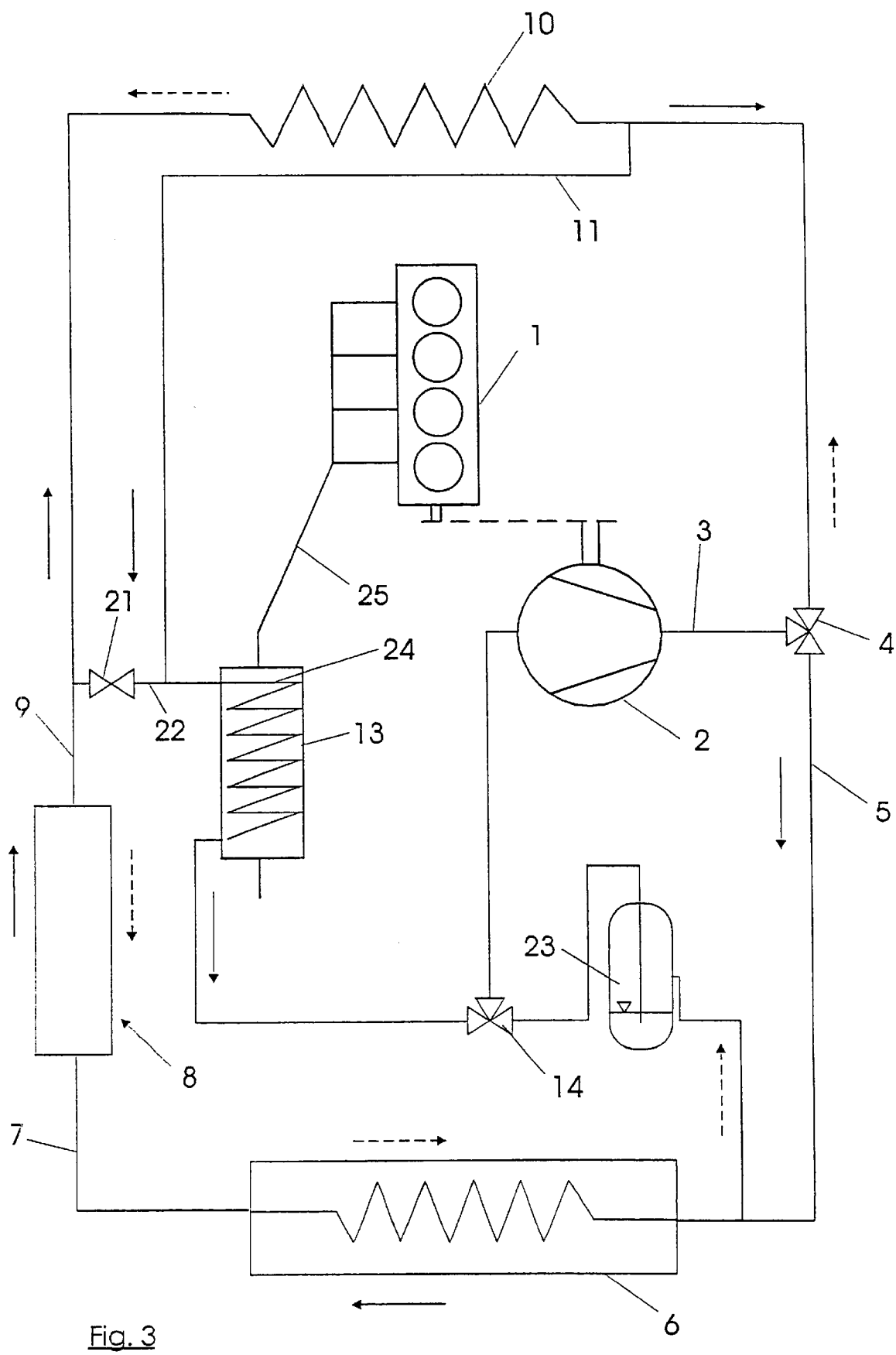
FIG. 3 is a circuit diagram of another embodiment of a device for heating and cooling a compartment of a motor vehicle similar to the devices of FIG. 1 and FIG. 2.

FIG. 3 shows a circuit diagram of another embodiment of the device for heating and cooling a compartment of a motor vehicle according to FIG. 1 and FIG. 2. A valve 21 in the switch position opens a bypass line 22 to the exhaust heat exchanger 13. Because of the pressure loss by the coolant in the ambient heat exchanger 10, only a small part of the coolant will flow through the latter so that the overwhelming majority of the coolant goes directly from the expansion device 8 to the exhaust heat exchanger 13 without the coolant having to be cooled on days with higher humidity and/or lower temperature or having to be expanded to a lower pressure, which causes an inefficient compressor power draw.

A buffer container 23 has the ability to store coolant. Depending on the operating mode (heating or cooling), because of the ability of the buffer container to store coolant, the coolant filling of the different volumes on the respective high pressure side and low pressure side and the respective temperatures of these volumes ensures sufficient intake pressure at compressor 2 when heat is given off and evaporation takes place. At the same time, the buffer container collects excess volumes of coolant from the circuit when there is a low requirement for cooling power or, in other words, with low pressures on the high pressure side. In addition, an adsorbent for absorbing the water in the circuit is provided in the buffer container 23.

Figure 4:
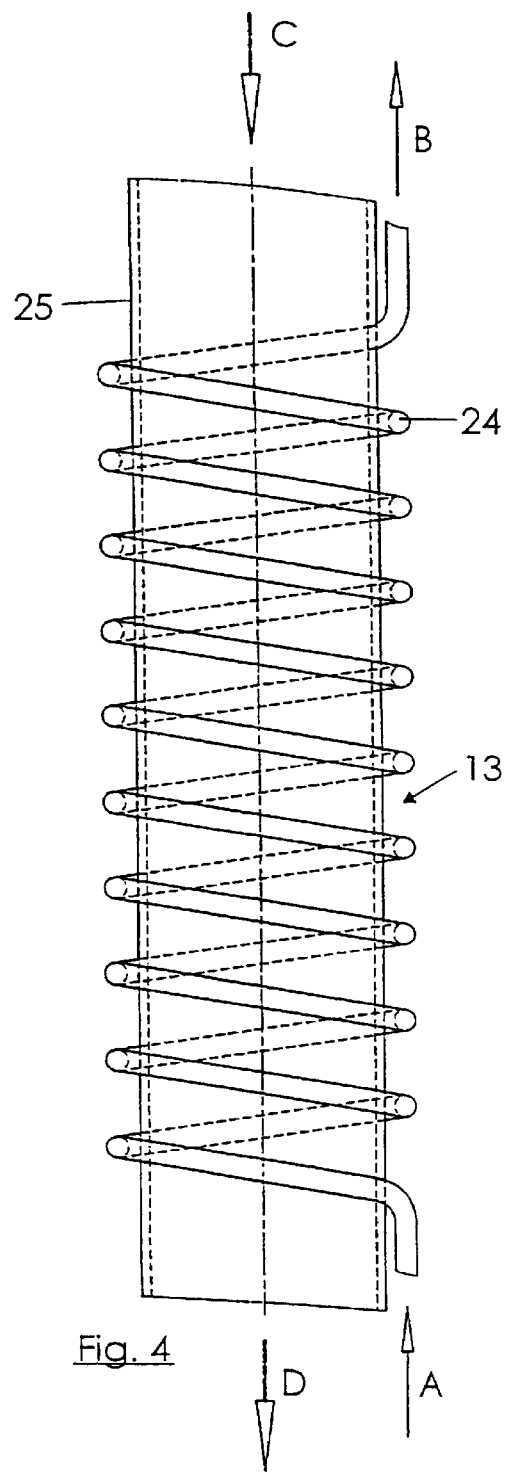
FIG. 4 is a coolant line arranged in a spiral fashion on an exhaust line.

The exhaust heat exchanger 13 is shown in FIG. 4. In the design of the exhaust heat exchanger 13, a coolant line 24 is located in the form of a spiral on the exterior of an exhaust line 25. Advantageously, exhaust heat exchanger 13 is designed as a countercurrent heat exchanger, with the flow direction of the coolant being indicated by an arrow marked A at the inlet of the exhaust heat exchanger 13 and an arrow marked B at the outlet. The flow direction of the exhaust from engine 1, guided in a countercurrent to the coolant, is indicated by an arrow C at the inlet of the heat exchanging area of exhaust line 25 and at its outlet by the arrow marked D. The advantage in having the exhaust and coolant guided in countercurrent with respect to one another lies in the fact that the maximum possible temperature differential always exists between the two media during the entire heat transfer process and so a good degree of exchange is achieved in exhaust heat exchanger 13.

The coiled coolant lines 24 of exhaust heat exchanger 13 are located in the vicinity of an exhaust purification system located in exhaust line 25, not shown in greater detail in the drawing, or downstream therefrom, in order not to interfere with the conversion of the exhaust gases.

Figure 5:
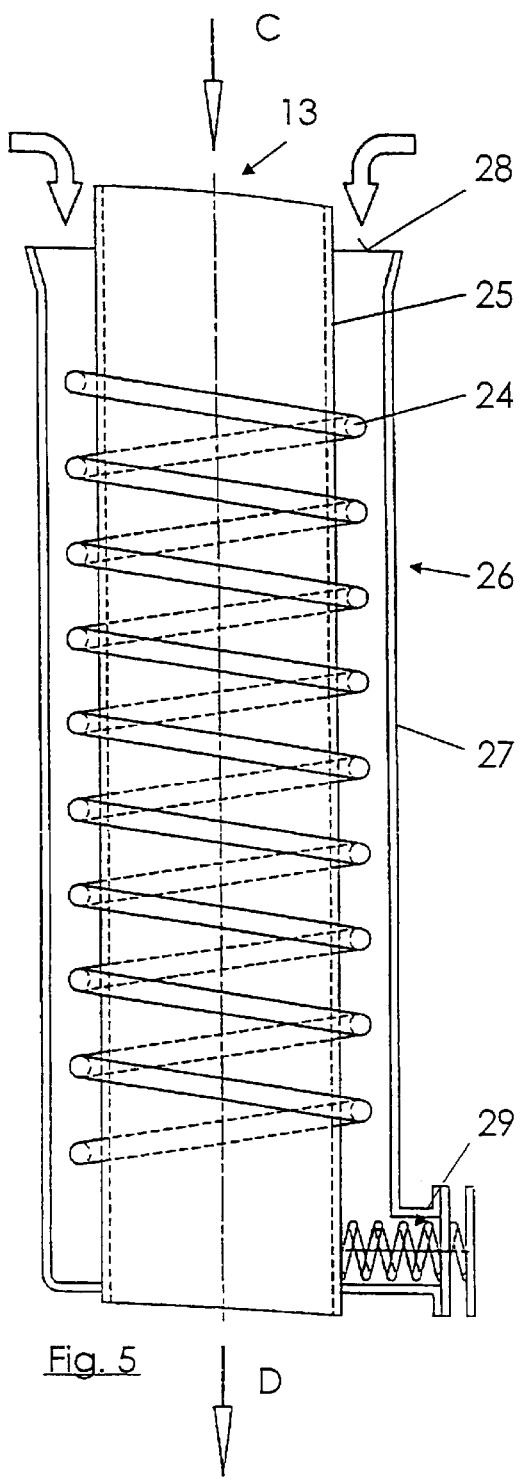
FIG. 5 is an exhaust heat exchanger with a regulating device designed as an enclosing tube.

An exhaust heat exchanger 13 is shown in FIG. 5. This exchanger additionally has a regulating device 26 for the volume of heat to be transferred from the exhaust to the coolant. Regulating device 26 is formed by a jacket 27 surrounding exhaust line 25. The jacket has an inlet opening 28 for wind. The cross section of the jacket expands in a flow direction and is closable in such a fashion that the device is subjected at its outlet 29 to a dynamic pressure called the wind blast. In this manner, the amount of heat that can be transferred from the exhaust to the coolant can be regulated. Thus, it is possible, shortly after starting the motor vehicle when the exhaust gases have a lower temperature by comparison with steady-state operation, to close outlet 29 of regulating device 26 and thus to avoid cooling of the coolant in coolant line 24 by colder ambient air flowing over it. On the other hand, outlet 29 can be opened during steady-state operation so that the air flowing in through inlet opening 28 flows over the coolant line 24 and thus carries away heat through outlet 29.

Figure 6:
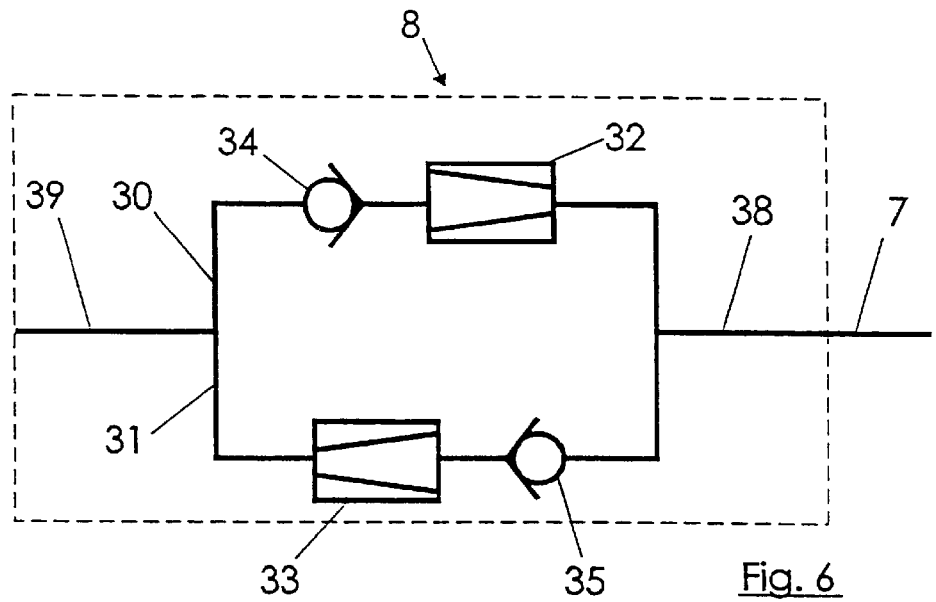
FIG. 6 is an embodiment of an expansion device that has two parallel coolant lines, each of which has an expansion valve and a check valve.

FIG. 6 shows an embodiment of the structure of expansion device 8. Two coolant lines 30 and 31 that run in parallel are shown, each of which has an expansion valve 32 and 33 connected in series with check valve 34 or 35. During a heating operation, the coolant in coolant line 30 is expanded in expansion valve 32 and then flows through check valve 34. The coolant line 31, on the other hand, is blocked to the coolant because of the operation of check valve 35 and thus acts as a blocking device. During cooling operation, illustrated in FIG. 1 by the dashed arrows, coolant line 30 works with expansion valve 32 and check valve 34 as a blocking device and the coolant is expanded by expansion valve 33 in the coolant line 31.

Figure 7:
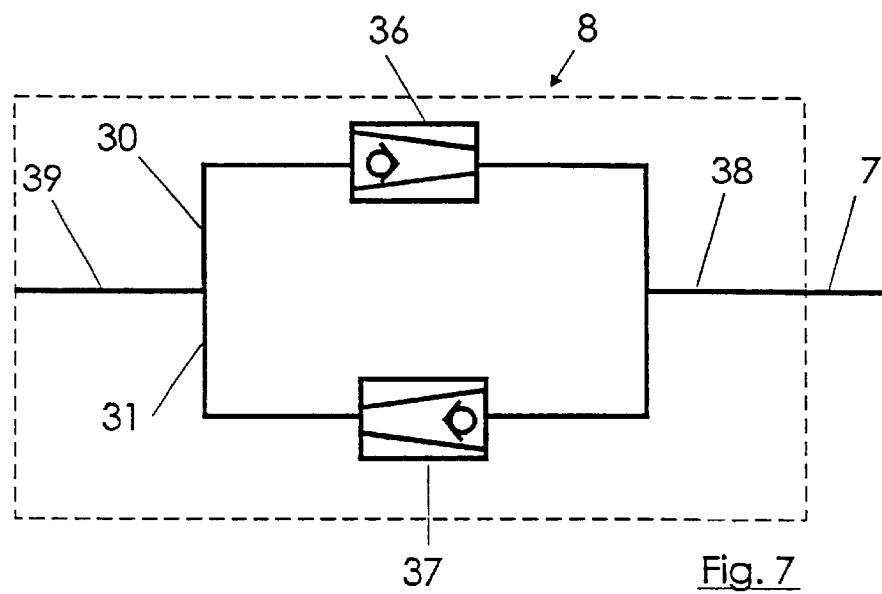
FIG. 7 is an embodiment of the expansion device according to FIG. 6 that has two parallel coolant lines, each of which has an expansion valve and a check valve, shown as a three-dimensional unit.

FIG. 7 shows, as a variation on parallel coolant lines 30 and 31 shown in FIG. 6, the expansion valve 32 or 33 and check valve 34 or 35 as a three-dimensional unit. This combination expansion and check valve 36 or 37 assumes the same functions as the expansion valves 32 and 33 and check valves 34 and 35 described above which are spatially separate in their design as expansion devices 8 according to the schematic diagram in FIG. 1.

Figure 8:
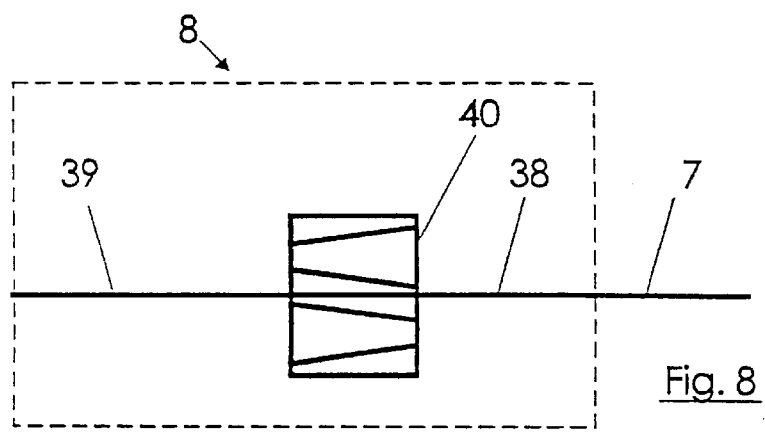
FIG. 8 is an embodiment of the expansion device according to FIG. 6 and FIG. 7 that has a coolant line containing a combination expansion valve in the form of a unit shown in three dimensions.

In FIG. 8, expansion device 8 has coolant lines 38 and 39 which contain a combination expansion valve 40 designed as a structural unit. The valve expands the coolant during a heating operation in the flow direction of the coolant and, likewise, expands the coolant in the flow direction during a cooling operation.

By means of a method for heating and cooling a compartment of a motor vehicle powered by an internal combustion engine, the coolant is successively expanded during heating operation in expansion device 8 to a temperature below the intake temperature of the coolant of compressor 2, exposed to warmer ambient air in ambient heat exchanger 10, heated by the exhaust from internal combustion engine 1 in exhaust heat exchanger 13, compressed in compressor 2, and cooled by cold vehicle interior air in interior compartment heat exchanger 6, and the vehicle interior is thus heated.

During a cooling operation, the coolant is exposed successively in ambient heat exchanger 10 to colder ambient air and is expanded in the expansion device 8 to a temperature below the compartment air temperature, with the compartment air being exposed in the interior heat exchanger 6 to the colder coolant.

Carbon dioxide ($CO_2$) has proven to be an especially suitable coolant which is environmentally harmless, nonflammable, and nonpoisonous. In addition, $CO_2$ has a high volumetric cooling power which, by comparison with other coolants, requires a smaller circulating mass flow in the device for heating and cooling with the same performance.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Device for heating and cooling a compartment of a motor vehicle powered by an internal combustion engine, said device comprising:

a coolant circuit including a compressor, an ambient heat exchanger, at least one expansion device, an interior air heat exchanger, and an exhaust heat exchanger that is heatable by exhaust gases from the internal combustion engine, a coolant guided during a heating operation through the compressor and, while giving off heat, through the interior heat exchanger connected downstream from the compressor;

a valve switchable from a heating operation position and a cooling operation position;

wherein, when the valve is switched to the heating operation position, said compressor, said interior heat exchanger, said at least one expansion device, said ambient heat exchanger, and said exhaust heat exchanger are connected in series such that the coolant is (i) expanded in said at least one expansion device to a temperature below an intake temperature of the coolant into the compressor, (ii) exposed in said ambient heat exchanger to warmer ambient air when said ambient heat exchanger is not bypassed, (iii) heated directly in said exhaust heat exchanger by the exhaust gases from said internal combustion engine, said exhaust gases piped continuously through said exhaust heat exchanger, and (iv) compressed in said compressor;

and further comprising a bypass valve operatively disposed between said at least one expansion device and said ambient heat exchanger wherein during said heating operation said bypass valve is operative to bypass said ambient heat exchanger when the coolant is expanded to a temperature that is below a temperature of ambient air that flows through said ambient heat exchanger and below a sublimation point of water in the ambient air, thus preventing formation of ice on said ambient heat exchanger, and wherein said exhaust heat exchanger is not bypassable in said series heating circuit by said bypass valve;

wherein, when the valve is switched to the cooling operation position, said compressor, said ambient heat exchanger, said at least one expansion device, and said interior heat exchanger are connected in series such that the coolant is (i) exposed in said ambient heat exchanger to colder ambient air, (ii) expanded in said at least one expansion device to a temperature below a compartment air temperature and (iii) a compartment air is exposed to the coolant in said interior heat exchanger.

2. Device according to claim 1, wherein said exhaust heat exchanger has coiled coolant lines arranged in coils on one of an interior and an exterior of an exhaust line.

3. Device according to claim 1, wherein the exhaust heat exchanger has the structure of a countercurrent heat exchanger.

4. Device according to claim 2, wherein said coiled coolant lines of said exhaust heat exchanger are located in fluid communication with an exhaust purification system located in one of an exhaust line and downstream of an exhaust line.

5. Device according to claim 4, and further comprising a regulating device in the exhaust heat exchanger which regulates the quantity of heat to be transferred from the exhaust gases to the coolant.

6. Device according claim 5, wherein the regulating device is a jacket surrounding said exhaust line and a coiled coolant line, said jacket having an end opening for a wind blast and being variable in its cross section such that it widens in the flow direction and is exposed, at its outlet, to dynamic pressure of the wind blast.

7. Device according to claim 1, wherein:
the at least one expansion device includes a first coolant line and a second coolant line connected parallel to the first coolant line;
each of the first and second coolant lines has an expansion valve and a check valve connected in series with the expansion valve;
the first coolant line is provided for expansion of the coolant during the heating operation and the second coolant line is provided as a blocking device; and
the first coolant line is provided during the cooling operation as a blocking device and the second coolant line is provided for expanding the coolant.

8. Device according to claim 7, wherein each of the expansion and check valves is designed as a three-dimensional unit in the form of a combination expansion and check valve.

9. Device according to claim 1, and further comprising coolant lines which have a combination expansion valve in the form of a three-dimensional unit, said valve being so designed that it is switchable for expansion of the coolant in both flow directions and a coolant flow can be blocked in the direction that is opposite the flow direction of the coolant.

10. Device according to claim 2, wherein the exhaust heat exchanger has the structure of a countercurrent heat exchanger.

11. Device according to claim 10, wherein said coiled coolant lines of said exhaust heat exchanger are located in fluid communication with of an exhaust purification system located in one of an exhaust line and downstream of an exhaust line.

12. Device according to claim 1, and further comprising a regulating device in the exhaust heat exchanger which regulates a quantity of heat transferred from the exhaust gases to the coolant.

13. Device according claim 12, wherein the regulating device is a jacket surrounding said exhaust line and a coiled coolant line, said jacket having an end opening for a wind blast and being variable in its cross section such that it widens in the flow direction and is exposed, at its outlet, to dynamic pressure of the wind blast.

14. Device according to claim 3, wherein:
the at least one expansion device includes a first coolant line and a second coolant line connected parallel to the first coolant line;
each of the first and second coolant lines has an expansion valve and a check valve connected in series with the expansion valve;
the first coolant line is provided for expansion of the coolant during the heating operation and the second coolant line is provided as a blocking device; and
the first coolant line is provided during the cooling operation as a blocking device and the second coolant line is provided for expanding the coolant.

15. Device according to claim 14, wherein each of the expansion and check valves is designed as a three-dimensional unit in the form of a combination expansion and check valve.

16. Method for heating and cooling a compartment of a motor vehicle powered by an internal combustion engine, including a coolant guided through a coolant circuit having a compressor, an ambient heat exchanger, at least one expansion device, an interior heat exchanger, and an exhaust heat exchanger that is heatable by exhaust gases from the internal combustion engine, a coolant being compressed and heated in the compressor during a heating operation and then cooled in the interior heat exchanger, comprising the steps of:

during a heating operation, heating the compartment by successively (i) expanding the coolant in said expansion device to a temperature below an intake temperature of the coolant into the compressor, (ii) exposing the coolant in said ambient heat exchanger to ambient air when said ambient heat exchanger is not bypassed, (iii) directly heating the coolant in said exhaust heat exchanger by exhaust gases from said internal combustion engine, said exhaust gases piped continuously through said exhaust heat exchanger, and (iv) compressing the coolant in said compressor;

and wherein during the heating operation, the method further comprising the steps of bypassing the ambient heat exchanger by a bypass valve operatively disposed between said at least one expansion device and said ambient heat exchanger when the coolant is expanded to a temperature that is below a temperature of ambient air that flows through said ambient heat exchanger and below a sublimation point of water in the ambient air, thus preventing formation of ice on said ambient heat exchanger, and wherein said exhaust heat exchanger is not bypassable in said series heating circuit by said bypass valve; and during a cooling operation, cooling the compartment by successively, (i) exposing the coolant to colder ambient air in said ambient heat exchanger, (ii) expanding the coolant in said expansion device to a temperature below a compartment air temperature, and (iii) exposing the compartment air in the interior heat exchanger to the coolant.

17. Method according to claim 16, wherein said coolant is a nonflammable and a nonpoisonous fluid.

18. Method according to claim 17, wherein said fluid is carbon dioxide.

19. A device for heating a compartment of a motor vehicle powered by an internal combustion engine, said device comprising:

a series heating circuit including a compressor, an interior heat exchanger, an expansion device, an ambient heat exchanger, an exhaust heat exchanger, and a bypass valve operatively disposed between said expansion device and said ambient heat exchanger;

wherein a coolant in said heating circuit is heated directly in said exhaust heat exchanger by exhaust gases from said internal combustion engine, said exhaust gases piped continuously through said exhaust heat exchanger;

and further wherein during a heating operation said bypass valve is operative to bypass said ambient heat exchanger when the coolant is expanded to a temperature that is below a temperature of ambient air that flows through said ambient heat exchanger and below a sublimation point of water in the ambient air, thus preventing formation of ice on said ambient heat exchanger, and wherein said exhaust heat exchanger is not bypassable in said series heating circuit by said bypass valve.

* * * * *